(12) United States Patent
Huang et al.

(10) Patent No.: US 10,634,841 B2
(45) Date of Patent: Apr. 28, 2020

(54) DISPLAY WITH MOVABLE SUPPORT OF LIGHT GUIDE PLATE

(71) Applicant: Coretronic Corporation, Hsin-Chu (TW)

(72) Inventors: Pei-Ting Huang, Hsin-Chu (TW); Bing-Han Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/231,626

(22) Filed: Dec. 24, 2018

(65) Prior Publication Data
US 2019/0204501 A1 Jul. 4, 2019

(30) Foreign Application Priority Data
Dec. 29, 2017 (CN) .......................... 2017 1 1471612

(51) Int. Cl.
*F21V 8/00* (2006.01)
*G02F 1/1333* (2006.01)

(52) U.S. Cl.
CPC ........... *G02B 6/0088* (2013.01); *G02B 6/005* (2013.01); *G02B 6/0068* (2013.01); *G02F 1/133308* (2013.01); *G02F 2001/133314* (2013.01); *G02F 2001/133317* (2013.01); *G02F 2201/50* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 9,341,765 B2* | 5/2016 | Fujiuchi | ............. | H04N 1/02855 |
| 9,583,046 B2* | 2/2017 | Shimizu | ............ | G02F 1/133308 |
| 10,042,110 B2* | 8/2018 | Park | .................. | G02F 1/133615 |
| 10,371,886 B2* | 8/2019 | Sugimoto | ............ | G02B 6/0088 |
| 2010/0315570 A1 | 12/2010 | Mathew et al. | | |
| 2012/0194760 A1* | 8/2012 | Fukuda | ............. | G02F 1/133308 |
| | | | | 349/58 |
| 2018/0314000 A1* | 11/2018 | Park | .................. | G02F 1/133615 |
| 2019/0129083 A1* | 5/2019 | Jeong | .................. | G02B 6/0065 |

FOREIGN PATENT DOCUMENTS

| | | |
|---|---|---|
| CN | 203298217 | 11/2013 |
| TW | 201219896 | 5/2012 |
| TW | 201346393 | 11/2013 |
| TW | 201403184 | 1/2014 |
| TW | 1526721 | 3/2016 |

* cited by examiner

*Primary Examiner* — Britt D Hanley

(57) ABSTRACT

A display including a display panel and a backlight module is provided. The backlight module includes a light guide plate and a support. The light guide plate includes a light exiting surface, a bottom surface opposite to the light exiting surface, and a light entering surface connected between the light exiting surface and the bottom surface. The support is disposed between the light guide plate and the display panel. The support is fixed to a side surface of the display panel facing the backlight module and is carried on the light exiting surface of the light guide plate. The support is in movable contact with the light exiting surface of the light guide plate.

10 Claims, 5 Drawing Sheets

DISPLAY WITH MOVABLE SUPPORT OF LIGHT GUIDE PLATE

CROSS-REFERENCE TO RELATED APPLICATION

THIS APPLICATION CLAIMS THE PRIORITY BENEFIT OF CHINA APPLICATION (CN201711471612.9 FILED ON Dec. 29, 2017). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display, and more particularly to a display having a narrow edge frame.

BACKGROUND OF THE INVENTION

Due to the flourishing of high-technology electronic information industry, consumer electronics have become necessities in people's daily life. Liquid crystal displays have gradually become overwhelming in various display products on the market due to the merits of lightweight, smaller volume, and lower radiation, etc.

As for conventional liquid crystal displays, since a variety of parts are included in the conventional liquid crystal displays, various molds are needed correspondingly. As a result, the cost of manufacture has been significant. In addition, since some of the parts are complex in structure, the overall volume of the liquid crystal displays may not be reduced. Furthermore, in narrow edge frame design, the size of a light guide plate may be compromised directly by a frame located at a side of a backlight module, and a bright line may be caused due to an edge of the light guide plate which is positioned unduly close to the display area. Therefore, the liquid crystal display may have poor display quality. In view of the above, how to solve or at least alleviate the above-mentioned problems is really one of the focuses for those skilled in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One of the objectives of the invention is to provide a display, which is designed to have a narrow edge frame and good display quality.

Other objectives and advantages of the invention can be further understood from the technical features disclosed in the invention.

In order to achieve one or a portion of or all of the objectives or other objectives, one of the embodiments of the invention provides a display including a display panel and a backlight module. The backlight module includes a light guide plate and a support. The light guide plate includes a light exiting surface, a bottom surface opposite to the light exiting surface, and a light entering surface connected between the light exiting surface and the bottom surface. The support is disposed between the light guide plate and the display panel. The support is fixed to a side surface of the display panel facing the backlight module and is carried on the light exiting surface of the light guide plate. The support is in movable contact with the light exiting surface of the light guide plate.

In the display of the embodiment of the invention, the support of the light guide plate is disposed between the light guide plate and the display panel and is fixed to a side of the display panel facing the backlight module. The support is carried on the light exiting surface of the light guide plate. In such design of structure, the size of the support may be significantly reduced, so as to be favorable in a narrow edge frame design. Since the size of the support is reduced, the interior space of the backlight module is increased, such that the dimension of the light guide plate can be increased and extended toward a non-display area. As such, the problem of a bright line caused by an edge of the light guide plate which is positioned unduly close to the display area may be substantially solved. The image quality of the display may be therefore improved. In addition, since the support is in movable contact with the light exiting surface of the light guide plate, and the support is disposed on the light exiting surface of the light guide plate, the light guide plate may be moved in the interior space of the backlight module due to thermal expansion and contraction caused by the varying ambient temperature, without being limited or blocked by support. When the light guide plate is moved due to thermal expansion and contraction, a damage which is caused from the squeeze of the light guide plate and the support is substantially avoided.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. The drawings are not necessarily drawn to scale.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
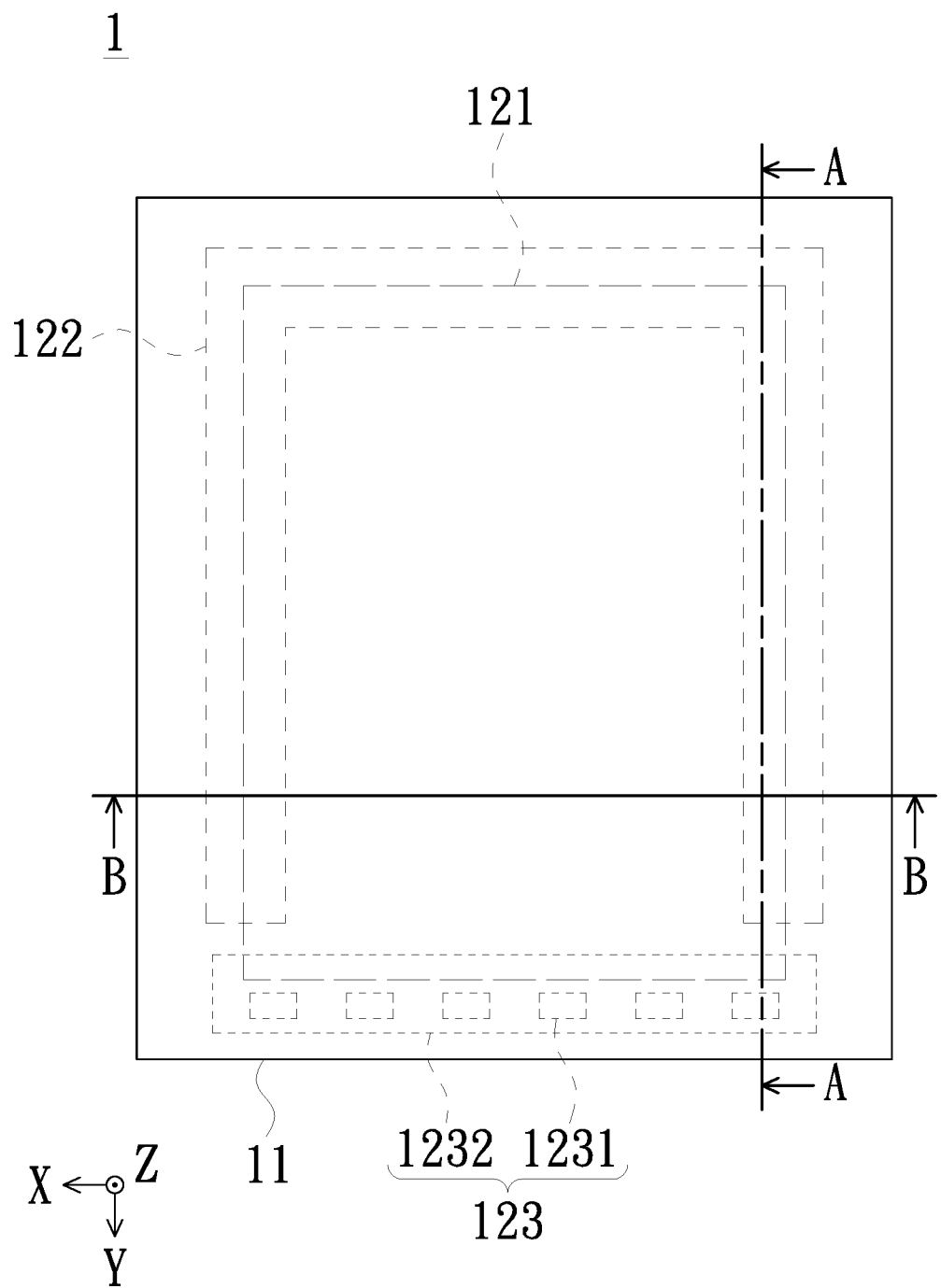
FIG. 1 is a schematic top view of a display in accordance with an embodiment of the invention.
Figure 2:
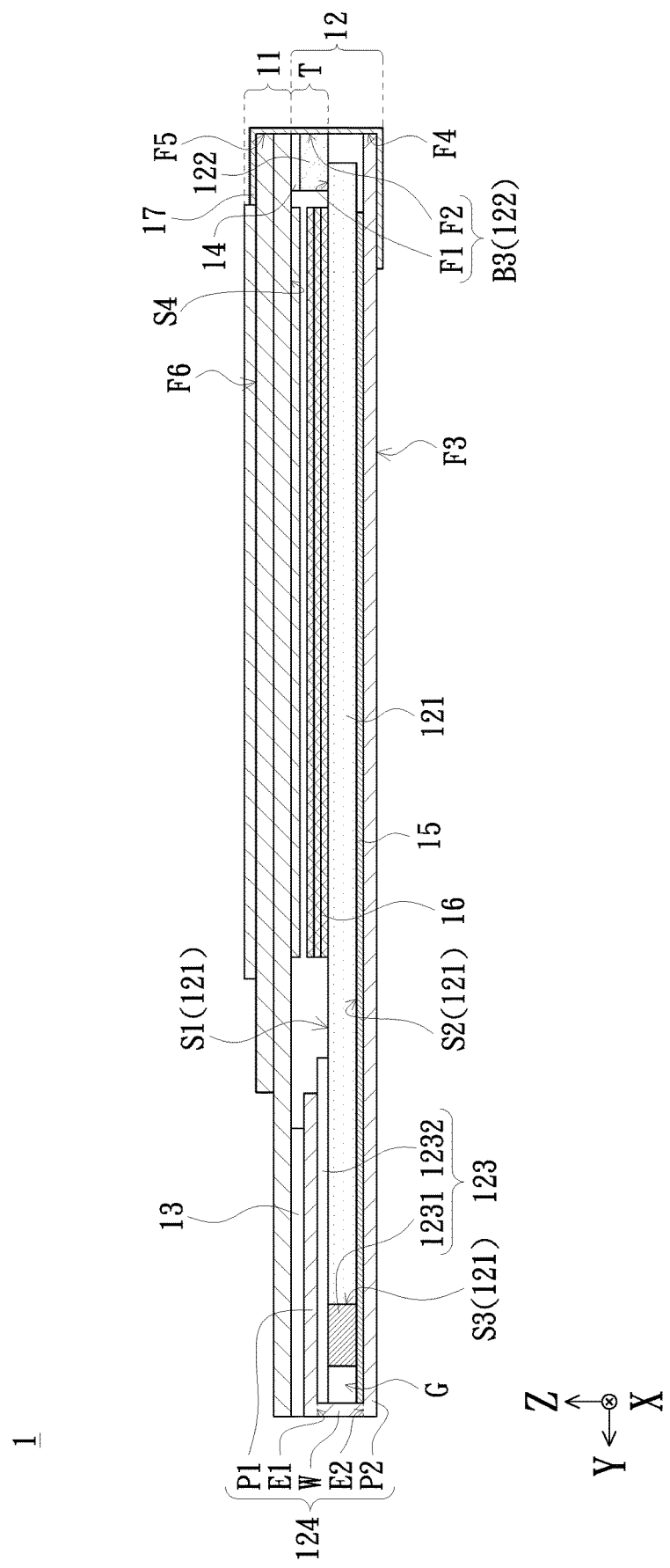
FIG. 2 is a schematic cross-sectional view taken along line AA shown in FIG. 1.
Figure 3:
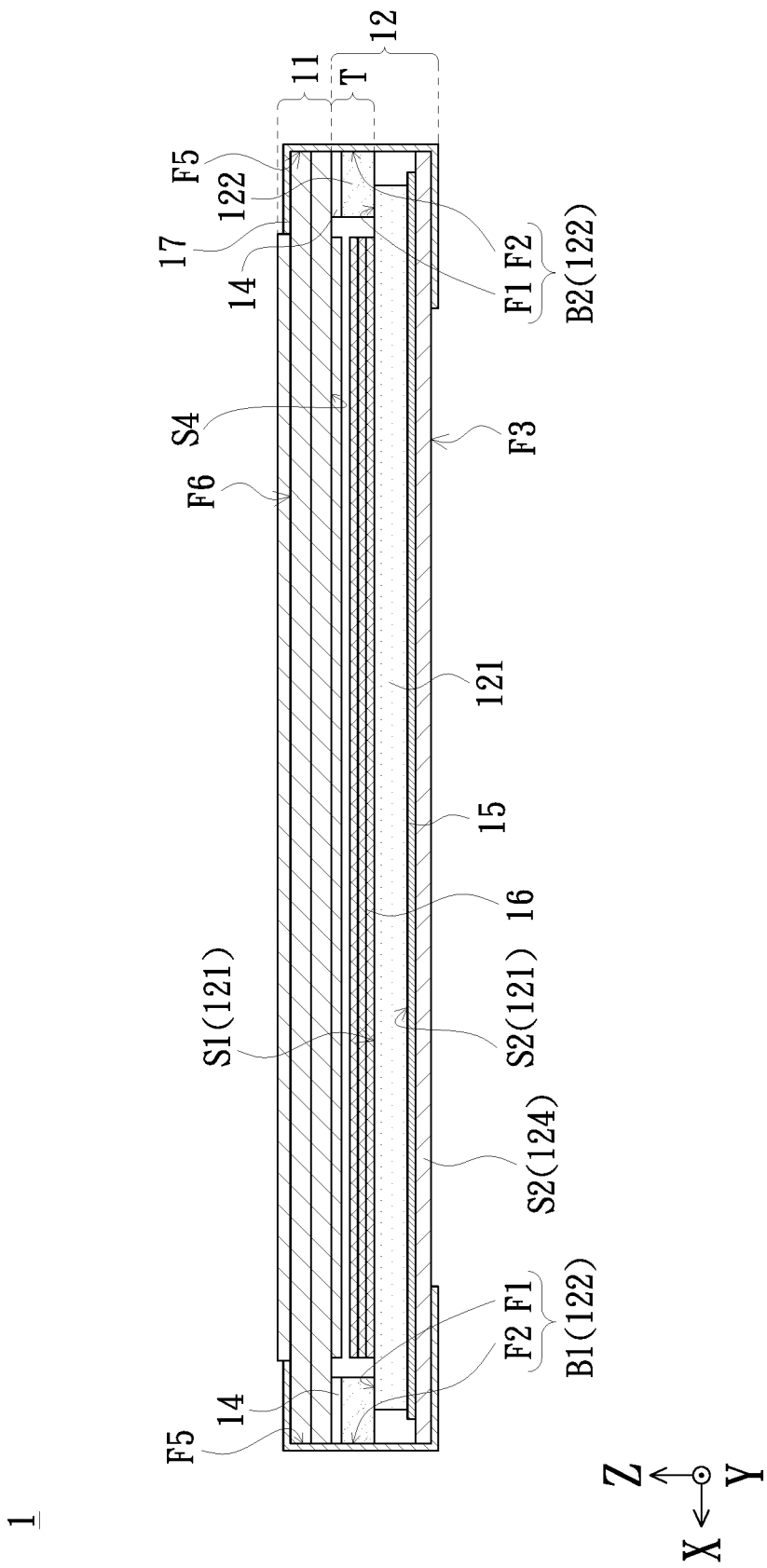
FIG. 3 is a schematic cross-sectional view taken along line BB shown in FIG. 1.

Please refer to FIG. 1 to FIG. 3. FIG. 1 is a schematic top view of a display in accordance with an embodiment of the invention. FIG. 2 is a schematic cross-sectional view taken along line AA shown in FIG. 1. FIG. 3 is a schematic cross-sectional view taken along line BB shown in FIG. 1. As shown in FIG. 1 to FIG. 3, a display 1 of the embodiment includes a display panel 11 and a backlight module 12. The backlight module 12 includes a light guide plate 121 and a support 122. The light guide plate 121 includes a light exiting surface S1, a bottom surface S2 opposite to the light exiting surface S1, and a light entering surface S3 connected between the light exiting surface S1 and the bottom surface S2. The support 122 is disposed between the light guide plate 121 and the display panel 11. The support 122 is fixed to a side surface S4 of the display panel 11 facing the backlight module 12, and is carried on the light exiting surface S1 of the light guide plate 121. In an embodiment, the display panel 11 covers the support 122, that is, the support does not exceed the area covered by the display panel. With the support 122 disposed between the display panel 11 and the light guide plate 121, the display panel 11 is supported on the light guide plate 121. In such a configuration, a conventional plastic frame may be omitted, and thus the non-display area of a display may be scaled down, so as to be favorable in a narrow edge frame design. In the embodiment, the support 122 is in movable contact with the light exiting surface S1 of the light guide plate 121. Since the support 122 is in movable contact with the light exiting surface S1 of the light guide plate 121, and the support 122 is disposed on the light exiting surface S1 of the light guide plate 121, the light guide plate 121 may be moved in the interior space of the backlight module 12 due to thermal expansion and contraction caused by the varying ambient temperature, without being limited or blocked by support 122. When the light guide plate 121 is moved due to thermal expansion and contraction, a damage which is caused from the squeeze of the light guide plate 121 and the support 122 is substantially avoided.

The following further describes other detailed structures of the display 1 of the embodiment and the backlight module 12 thereof.

As shown in FIG. 1 to FIG. 3, the backlight module 12 of the embodiment further includes a light source 123 and a back board 124. The light source 123 is disposed at the light entering surface S3 of the light guide plate 121. The back board 124 is used for carrying the light guide plate 121, the light source 123, and the display panel 11. In detail, the back board 124 of the embodiment includes a first extension portion P1, a second extension portion P2, and a side wall W. The first extension portion P1 extends out from a first end E1 of the side wall W in a direction toward the interior of the backlight module 12. The second extension portion P2 extends out from a second end E2 of the side wall W opposite to the first end E1 in a direction toward the interior of the backlight module 12. In the embodiment, the extending directions of the first extension portion P1 and the second extension portion P2 are perpendicular to the extending direction of the side wall W. That is, the first extension portion P1 and the second extension portion P2 are parallel to each other. In the embodiment, the light guide plate 121 and the light source 123 are located between the first extension portion P1 and the second extension portion P2. The first extension portion P1 of the back board 124 is used for carrying the display panel 11. The second extension portion P2 is used for carrying the light guide plate 121 and the light source 123. In detail, the first extension portion P1 carries a part of the display panel 11, that is, the first extension portion P1 carries a side portion of the display panel 11 adjacent to the light source 123. The light source 123 is located in an accommodation space G surrounded by the first extension portion P1, the second extension portion P2 and the side wall W. In addition, in the embodiment, the light source 123 includes a light emitting element 1231 and a circuit board 1232. The light emitting element 1231 is disposed on the circuit board 1232. The light emitting element 1231 is located beside the light entering surface S3 of the light guide plate 121. The light emitting element 1231 is configured to provide light beam that enters the interior of the light guide plate 121 through the light entering surface S3 of the light guide plate 121. The circuit board 1232 is located between the first extension portion P1 of the back board 124 and the light emitting element 1231, and between the first extension portion P1 and a part of the light exiting surface S1 of the light guide plate 121.

As shown in FIG. 1 to FIG. 3, the display 1 of the embodiment further includes a first adhesive portion 13 and a second adhesive portion 14. In the embodiment, the first adhesive portion 13 and the second adhesive portion 14 are, for example, double-sided adhesive tapes or optical adhesive portions. The invention does not limit the types and forms of the first adhesive portion 13 and the second adhesive portion 14. The first adhesive portion 13 is disposed between the first extension portion P1 of the back board 124 and the display panel 11. The second adhesive portion 14 is disposed between the support 122 and the display panel 11. With the first adhesive portion 13, a side portion of the display panel 11 (that is, a side portion of the display panel 11 adjacent to the light source 123) and the first extension portion P1 of the back board 124 are adhesively fixed to each other along the X direction and the Y direction. With the second adhesive portion 14, another three side portions of the display panel 11 and the support 122 are adhesively fixed to each other along the X direction and the Y direction.

Figure 4:
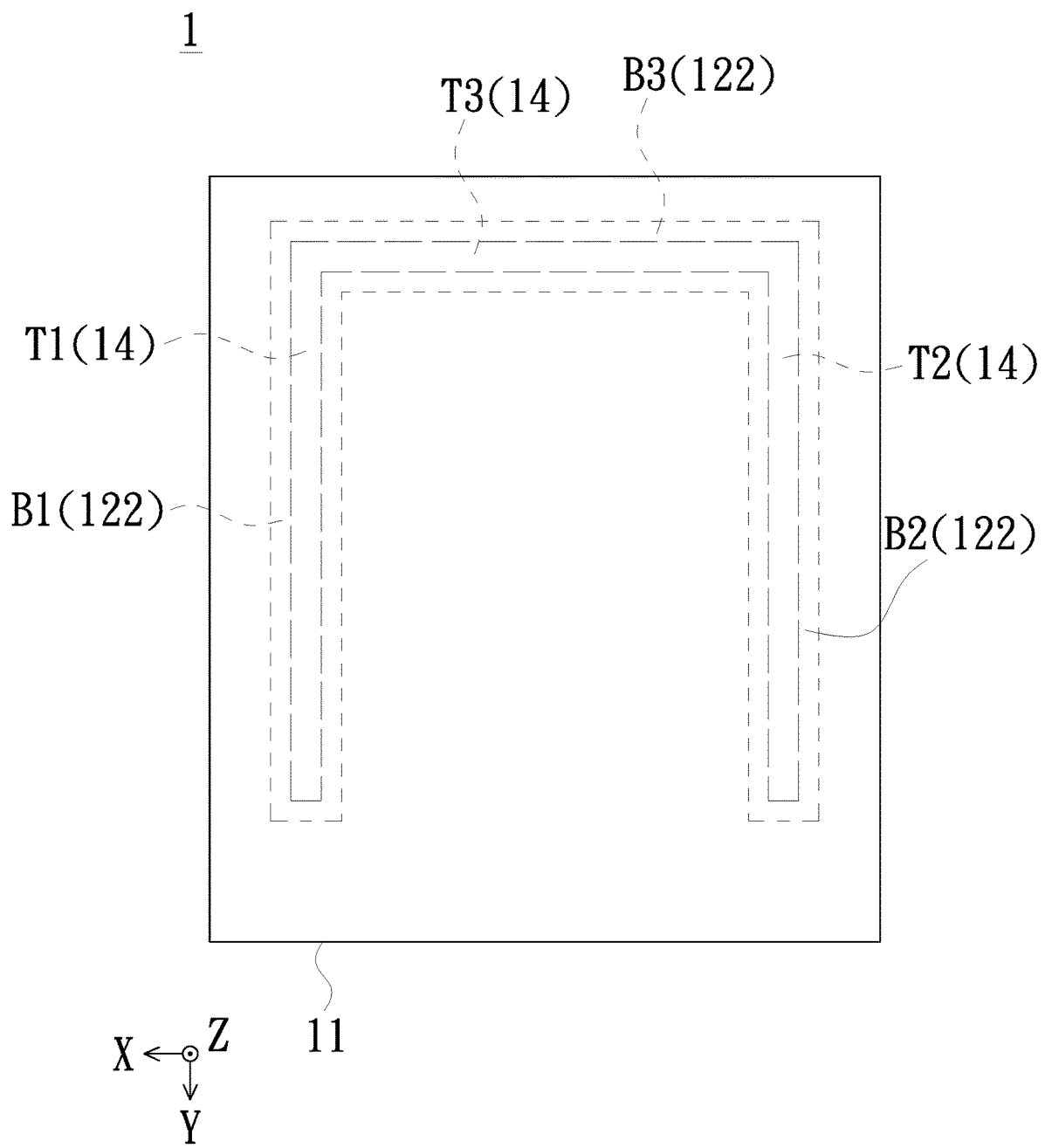
FIG. 4 is a schematic configuration view of a support and a second adhesive portion shown in FIGS. 2 and 3.

FIG. 4 is a schematic configuration view of the support 122 and the second adhesive portion 14 shown in FIGS. 2 and 3. It should be noted that FIG. 4 and FIG. 1 are views from the same viewing angle (top views). However, in order to clearly present the configuration of the support 122 and the second adhesive portion 14, components such as the light guide plate 121 and the light source 123 shown in FIG. 1 are omitted from FIG. 4. As shown in FIG. 2 to FIG. 4, the support 122 of the embodiment includes a first bar B1, a second bar B2, and a third bar B3. The first bar B1 of the support 122 is opposite to the second bar B2. The third bar B3 is connected between the first bar B1 and the second bar B2. The third bar B3 is opposite to the first extension portion P1 of the back board 124. In the embodiment, the first bar B1, the second bar B2, and the third bar B3 of the support 122 are connected to one another and exhibit a ⊓-shaped configuration. That is, the first bar B1, the second bar B2, and the third bar B3 of the support 122 may be formed integrally in structure. However, the invention is not limited thereto. In other embodiments, the first bar B1, the second bar B2, and the third bar B3 of the support 122 are, for example, structures which are independent from and not connected to one another. The second adhesive portion 14 of the embodiment includes a first adhesive section T1, a second adhesive section T2, and a third adhesive section T3. The first adhesive section T1 is disposed at the first bar B1 of the support 122. The second adhesive section T2 is disposed at the second bar B2 of the support 122. The third adhesive section T3 is disposed at the third bar B3 of the support 122. In the embodiment, the first adhesive section T1, the second adhesive section T2, and the third adhesive section T3 of the second adhesive portion 14 are connected to one another and exhibit a ⊓-shaped configuration. That is, the first adhesive section T1, the second adhesive section T2, and the third adhesive section T3 of the second adhesive portion 14 may be formed integrally in structure. However, the invention is not limited thereto. In other embodiments, the first adhesive section T1, the second adhesive section T2, and the third adhesive section T3 of the second adhesive portion 14 are, for example, structures which are independent from and not connected to one another. It should be noted that the support 122 of the embodiment includes materials that may not be subjected to deform when applied a pressure, such as plastic with better rigidity, metal, etc. However, the invention is not limited thereto. In addition, a thickness T of the support 122 of the embodiment is greater than or equal to 0.05 millimeters and less than or equal to 3 millimeters, but the invention is not limited thereto. In an embodiment, a thickness of the support 122 is between 0.05 millimeters and 0.4 millimeters. In yet another embodiment, a thickness of the support 122 is between 0.4 millimeters and 3 millimeters.

As shown in FIG. 2 and FIG. 3, the display 1 of the embodiment further includes a reflective sheet 15 and at least one optical film 16. The reflective sheet 15 is disposed between the second extension portion P2 of the back board 124 and the bottom surface S2 of the light guide plate 121 and between the second extension portion P2 of the back board 124 and the light source 123. In the embodiment, the number of the optical films 16 is three. The optical films 16 may be light collecting sheets, diffusion sheets, homogenizing sheets, composite optical films or combinations thereof. The invention is not limited thereto. The optical films 16 are located between the light exiting surface S1 of the light guide plate 121 and the display panel 11. The support 122 surrounds the optical films 16. That is, the first bar B1, the second bar B2, and the third bar B3 of the support 122 surround the optical films 16.

As shown in FIG. 2 and FIG. 3, in the embodiment, the light guide plate 121 is located between the optical films 16 and the second extension portion P2 of the back board 124. The light guide plate 121 is further located between the support 122 and the second extension portion P2 of the back board 124. It can be seen that the second extension portion P2 of the back board 124 of the embodiment extends continuously from the side wall W to positions below the first bar B 1, the second bar B2 and the third bar B3 of the support 122, and positions below the optical films 16. That is, the second extension portion P2 of the back board 124 is used for carrying the light guide plate 121, the support 122, the light source 123, the reflective sheet 15, and the optical films 16.

As shown in FIG. 2 and FIG. 3, the support 122 of the embodiment has a first surface F1 in contact with the light exiting surface S1 of the light guide plate 121, and a first side surface F2 adjacent to the first surface F1. The first side surface F2 of the support 122 faces away from the optical films 16. The second extension portion P2 of the back board 124 of the embodiment has a bottom surface F3 facing away from the reflective sheet 15, and an end surface F4 adjacent to the bottom surface F3. The end surface F4 of the second extension portion P2 and the first side surface F2 of the support 122 face in the same direction. The display panel 11 of the embodiment has a second side surface F5, facing in the same direction with the first side surface F2 of the support 122, and a top surface F6 adjacent to the second side surface F5. The top surface F6 of the display panel 11 is opposite to the side surface S4 to which the support 122 is fixed. The backlight module 12 of the embodiment further includes an adhesive tape 17. The adhesive tape 17 is disposed at the first side surface F2 of the support 122, the bottom surface F3 and the end surface F4 of the second extension portion P2, and the second side surface F5 and the top surface F6 of the display panel 11, so that the display panel 11, the support 122, and the second extension portion P2 of the back board 124 are fixed to one another along the Z direction. However, it should be noted that, since the adhesive tape 17 of the embodiment may be extensible, the support 122 is in movable contact with the light exiting surface S1 of the light guide plate 121 when the display panel 11, the support 122, and the second extension portion P2 of the back board 124 are fixed to one another by using the adhesive tape 17. With the configuration in which the display panel 11, the support 122, and the second extension portion P2 of the back board 124 are fixed to one another by using the above-mentioned adhesive tape 17, a conventional plastic frame or other like fixing structures may be omitted. As such, the non-display area of a display may be scaled down, the cost may be reduced, and/or the assembling may be simplified.

Figure 5:
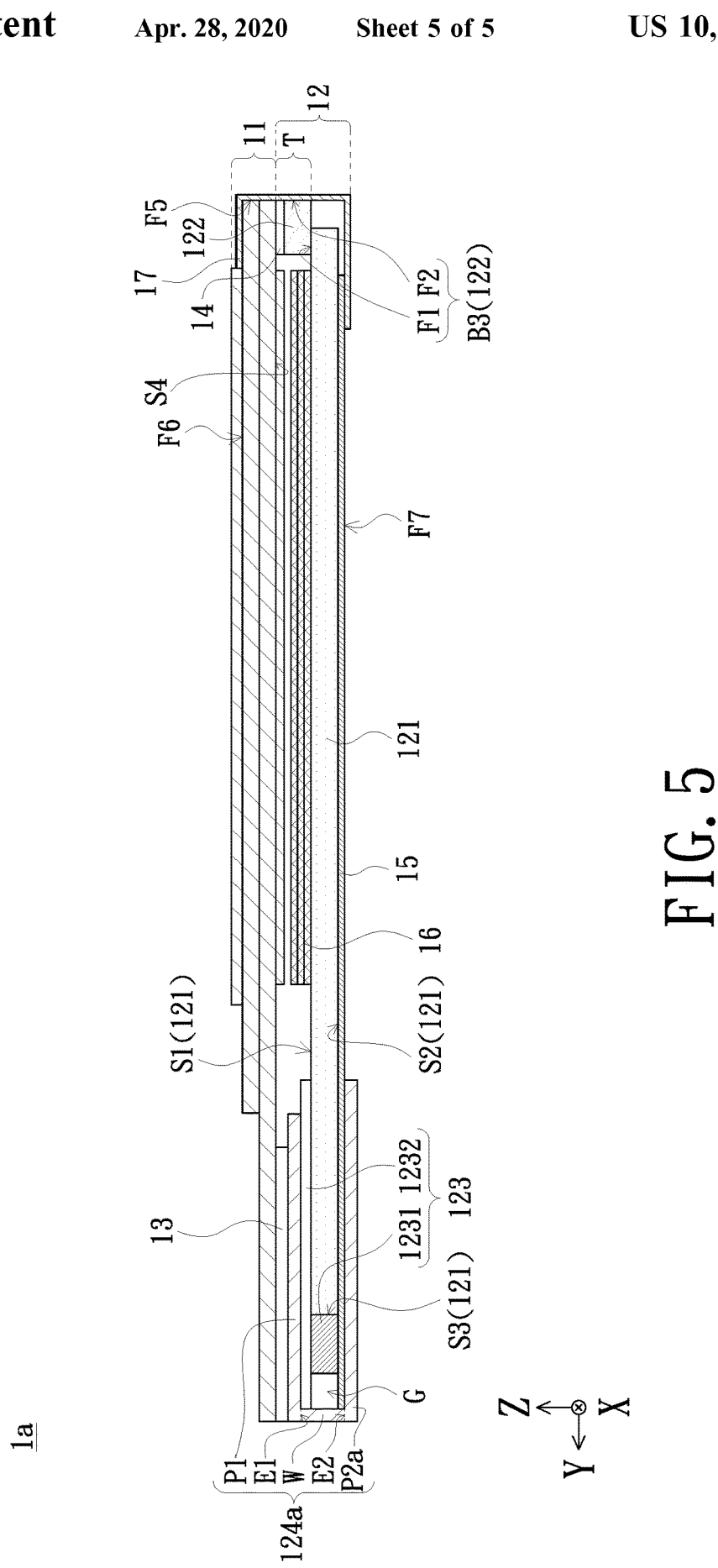
FIG. 5 is a schematic cross-sectional view of a display in accordance with another embodiment of the invention.

FIG. 5 is a schematic cross-sectional view of a display 1a in accordance with another embodiment of the invention. The display 1a of the embodiment is similar to the display 1 shown in FIG. 1 to FIG. 4. The differences are that a second extension portion P2a of a back board 124a of the embodiment does not extend to positions below the support 122, and the adhesive tape 17 is disposed at the first side surface F2 of the support 122, the second side surface F5 and the top surface F6 of the display panel 11, and a lower surface F7 of the reflective sheet 15. In such design of structure of the display 1a in the embodiment, the thickness of the display 1 a can be significantly reduced, so as to be favorable in a thinner display.

In summary, in the display of the embodiment of the invention, the support of the light guide plate is disposed between the light guide plate and the display panel and is fixed to a side of the display panel facing the backlight module. The support is carried on the light exiting surface of the light guide plate. In such design of structure, the size of the support may be significantly reduced, so as to be favorable in a narrow edge frame design. Since the size of the support is reduced, the interior space of the backlight module is increased, such that the dimension of the light guide plate can be increased and extended toward a non-display area. As such, the problem of a bright line caused by an edge of the light guide plate which is positioned unduly close to the display area may be substantially solved. The image quality of the display may be therefore improved. In addition, since the support is in movable contact with the light exiting surface of the light guide plate, and the support is disposed on the light exiting surface of the light guide plate, the light guide plate may be moved in the interior space of the backlight module due to thermal expansion and contraction caused by the varying ambient temperature, without being limited or blocked by support. When the light guide plate is moved due to thermal expansion and contraction, a damage which is caused from the squeeze of the light guide plate and the support is substantially avoided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first extension portion, the second extension portion, the first end, the second end, the first adhesive portion, the second adhesive portion, the first bar, the second bar, the third bar, the first adhesive section, the second adhesive section, the third adhesive section, the first surface, the first side surface, and the second side surface are only used for distinguishing various elements and do not limit the number of the elements.

What is claimed is:

1. A display, comprising a display panel and a backlight module, wherein the backlight module comprises:
    a light guide plate, comprising a light exiting surface, a bottom surface opposite to the light exiting surface, and a light entering surface connected between the light exiting surface and the bottom surface; and
    a support, disposed between the light guide plate and the display panel, wherein the support is fixed to a side surface of the display panel facing the backlight module and is carried on the light exiting surface of the light guide plate, and the support is in movable contact with the light exiting surface of the light guide plate.

2. The display according to claim 1, wherein the backlight module further comprises:
    a light source, disposed at the light entering surface of the light guide plate; and
    a back board, used for carrying the light guide plate, the light source, and the display panel.

3. The display according to claim 2, wherein the back board comprises a first extension portion, a second extension portion and a side wall, the first extension portion extends out from a first end of the side wall, the second extension portion extends out from a second end of the side wall opposite to the first end, the light guide plate and the light source are located between the first extension portion and the second extension portion, the first extension portion is used for carrying the display panel, and the second extension portion is used for carrying the light guide plate and the light source.

4. The display according to claim 3, further comprising a first adhesive portion and a second adhesive portion, wherein the first adhesive portion is disposed between the first extension portion of the back board and the display panel, and the second adhesive portion is disposed between the support and the display panel.

5. The display according to claim 4, wherein the support comprises a first bar, a second bar and a third bar, the first bar is opposite to the second bar, the third bar is connected between the first bar and the second bar, the third bar is opposite to the first extension portion of the back board, the second adhesive portion comprises a first adhesive section, a second adhesive section and a third adhesive section, the first adhesive section is disposed at the first bar, the second adhesive section is disposed at the second bar, and the third adhesive section is disposed at the third bar.

6. The display according to claim 3, wherein the light source comprises a light emitting element and a circuit board, and the circuit board is located between the light emitting element and the first extension portion and between the light guide plate and the first extension portion.

7. The display according to claim 3, further comprising a reflective sheet and at least one optical film, wherein the reflective sheet is disposed between the second extension portion and the light guide plate and between the second extension portion and the light source, the at least one optical film is located between the light guide plate and the display panel, and the support surrounds the at least one optical film.

8. The display according to claim 7, wherein the light guide plate is located between the at least one optical film and the second extension portion and between the support and the second extension portion.

9. The display according to claim 7, wherein the support has a first surface in contact with the light exiting surface, and a first side surface adjacent to the first surface,
- wherein the first side surface faces away from the at least one optical film, the second extension portion has a bottom surface facing away from the reflective sheet, and an end surface adjacent to the bottom surface,
- wherein the end surface and the first side surface face in the same direction, the display panel has a second side surface facing in the same direction as the first side surface, and a top surface adjacent to the second side surface,
- wherein the top surface is opposite to the side surface to which the support is fixed, and
- wherein the backlight module further comprises an adhesive tape, and the adhesive tape is disposed at the first side surface of the support, the bottom surface and the end surface of the second extension portion, and the top surface and the second side surface of the display panel.

10. The display according to claim 1, wherein a thickness of the support is greater than or equal to 0.05 millimeters, and less than or equal to 3 millimeters.

* * * * *